(12) United States Patent
Eguchi et al.

(10) Patent No.: US 6,379,278 B1
(45) Date of Patent: Apr. 30, 2002

(54) VEHICULAR TRANSMISSION STOP CONTROL SYSTEM

(75) Inventors: Takahiro Eguchi; Daihei Teshima; Hiroyuki Katano, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1 days.

(21) Appl. No.: 09/614,459

(22) Filed: Jul. 12, 2000

(30) Foreign Application Priority Data

Jul. 14, 1999 (JP) .......................................... 11-199865

(51) Int. Cl.$^7$ .............................................. B60K 41/04
(52) U.S. Cl. .............................. 477/34; 477/39; 477/44
(58) Field of Search .............................. 477/34, 37, 38, 477/40, 44, 46, 47, 48, 50

(56) References Cited

U.S. PATENT DOCUMENTS

| | | | | |
|---|---|---|---|---|
| 4,126,200 A | * | 11/1978 | Miller et al. ............... | 180/66 R |
| 5,024,638 A | * | 6/1991 | Sakakibara et al. .......... | 475/110 |
| 6,338,695 B1 | * | 1/2002 | Aoki et al. ................. | 477/160 |

FOREIGN PATENT DOCUMENTS

| | | | | |
|---|---|---|---|---|
| JP | 62031533 | * | 2/1987 | .................. 74/491 |
| JP | 4271941 | * | 9/1992 | |

* cited by examiner

*Primary Examiner*—Sherry Estremsky
*Assistant Examiner*—Tisha D. Lewis
(74) *Attorney, Agent, or Firm*—Armstrong, Westerman & Hattori, LLP

(57) ABSTRACT

A vehicular transmission including an engine, a continuously variable transmission CVT and a starting clutch. The driving force from the engine is transmitted through the continuously variable transmission CVT with a speed change to a countershaft, and the starting clutch is used to transmit this driving force from the countershaft to wheels of a vehicle. The continuously variable transmission CVT is hydraulically controlled by a control valve CV which receives control signals through a line from an electrical control unit ECU. After the vehicle has decelerated and stopped, and after the engine has stopped by an idling elimination control, the electrical current that controls the control valve CV is adjusted almost to zero.

8 Claims, 7 Drawing Sheets

VEHICULAR TRANSMISSION STOP CONTROL SYSTEM

BACKGROUND OF THE INVENTION

The present invention relates generally to a mechanical power transmission for driving a vehicle, which transmission transmits the driving force output from the engine to the drive wheels of the vehicle with a speed change being performed by a speed change mechanism.

1. Field of the Invention

Many such transmissions have been used for driving vehicles, and a variety of speed change mechanisms are incorporated in the transmissions, ranging from gear transmissions with a plurality of steps of speed change ratios to continuously variable transmissions with gradually varying speed change ratio controlled by means of a belt, etc. Recently, a hybrid transmission which uses an electrical motor in addition to an engine has been introduced for fuel efficiency. The applicant of the present invention is also developing a hybrid transmission. This hybrid transmission comprises a continuously variable transmission with a metal V-belt which is disposed around the common output shaft of the engine and the electrical motor arranged in series, and the output shaft of the continuously variable transmission is provided with a starting clutch (main clutch).

2. Description of the Related Art

One purpose for developing this transmission is to improve fuel efficiency. Therefore, desirably, the operation of the engine be controlled such that the engine stops its operation when the vehicle come into a halt (such control is here referred to as "idling elimination control"). As an idling elimination control, there is a method to stop the engine when the engine comes into an idling condition after the vehicle has stopped completely. However, while the vehicle is decelerating after the accelerator pedal once depressed has been released, an engine brake is effected. It is known that, during this deceleration, the fuel injection to the engine is terminated (or the supply of fuel is terminated). In consideration of this fuel supply termination, there is a more desirable way to eliminate engine idling. When the vehicle is decelerated to a halt, the fuel injection is terminated, and this condition of non-fuel supply should be maintained to stop the operation of the engine (this control is referred to as "engine strop control").

Although this engine stop control successfully improves the fuel efficiency by terminating the fuel injection, there is still a need for improvement. In a prior-art engine stop control, after the operation of the engine is terminated, electricity is still kept flowing through a circuit which controls the speed change mechanism, especially through the solenoids of the linear solenoid valves that control the starting clutch and the variable widths of the pulleys of the metal belt type continuously variable transmission (this electricity is referred to as "base current"). This is somewhat wasteful. On the other hand, if this base current is terminated before the rotation of the engine ceases and the hydraulic pressure supplied from the oil pump becomes zero, then there will be another problem. In this case, the hydraulic pressures used for controlling the variable widths of the drive and driven pulleys will increase to a maximum value (generating a maximum thrust), and this condition may affect the durability of the metal belt, the drive and driven pulleys, etc. of the speed change mechanism.

SUMMARY OF THE INVENTION

It is an object of the present invention to provide a stop control system for a vehicular transmission which system conserves electricity by avoiding wasteful power consumption without causing any adverse effect to the durability of the speed change mechanism.

In order to achieve this objective, the present invention provides a stop control system for a mechanical power transmission used for driving a vehicle. Here, the power transmission comprises a speed change mechanism (for example, the continuously variable transmission CVT of the embodiment described in the following section), which transmits a driving force from an engine with a speed change. In this transmission, the engine is controlled to stop when the vehicle is brought into a halt. After the engine has stopped, a control that adjusts an electrical current controlling the speed change mechanism almost to zero (or substantially to zero) is executed.

In the transmission, whose engine is stopped when the vehicle is stopped, after the engine has stopped, there is no need to control the speed change mechanism. Therefore, the electrical current that controls the speed change mechanism is adjusted almost to zero according to the present invention. Because the control current is supplied as necessary before the engine stops, the durability of the speed change mechanism is not affected adversely. After the engine has stopped, the control current is terminated to avoid wasteful power consumption. Here, making the control current almost to zero means that the control current is reduced to a level at which only a weak current (normally, about a few mA~about a few 10 mA) is left flowing.

It is preferable that the control for adjusting the electrical current which controls the speed change mechanism almost to zero be executed after the engine has stopped, and after the hydraulic pressure which actuates the speed change mechanism has decreased. The hydraulic pressure for the speed change mechanism is generated by an oil pump, which is generally connected to the input shaft of the speed change mechanism and rotated by the engine. When the engine stops, the oil pump also stops, and the pressure decreases gradually. Just after the engine has stopped, the pressure in the hydraulic circuit has not decreased much. If the control current is adjusted almost to zero immediately in this condition, for example, the above mentioned problem that the hydraulic pressures used for controlling the variable widths of the drive and driven pulleys will increase to a maximum value and may affect the durability of the speed change mechanism. In the power transmission according to the present invention, the control current for the speed change mechanism is terminated after these hydraulic pressures have decreased. Thus, the electrical current not necessary after the termination of the operation of the engine is terminated to save electricity without any adverse effect to the durability of the speed change mechanism.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
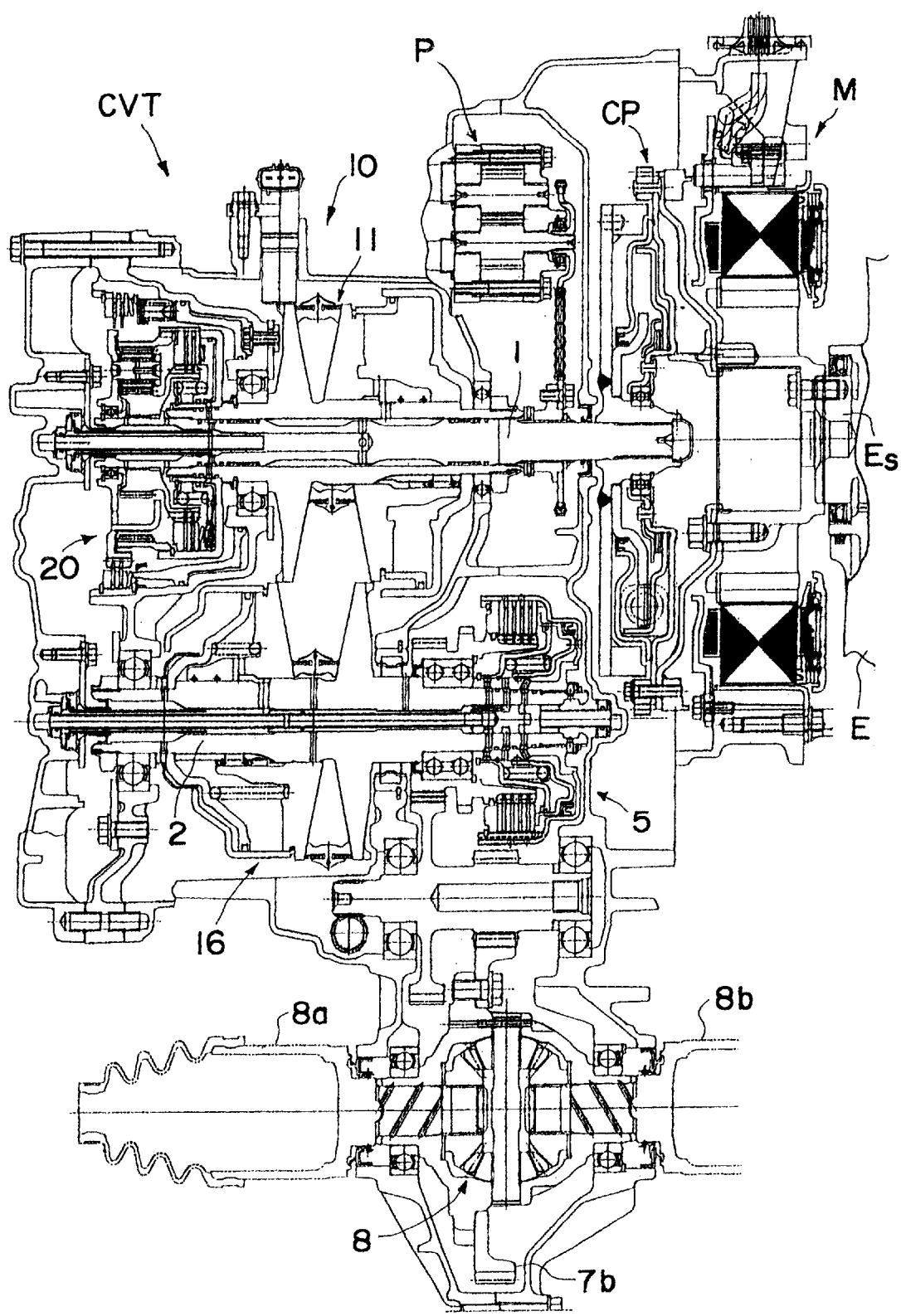
FIG. 1 is a cross-sectional view of a vehicular transmission which incorporates a control system according to the present invention.
Figure 2:
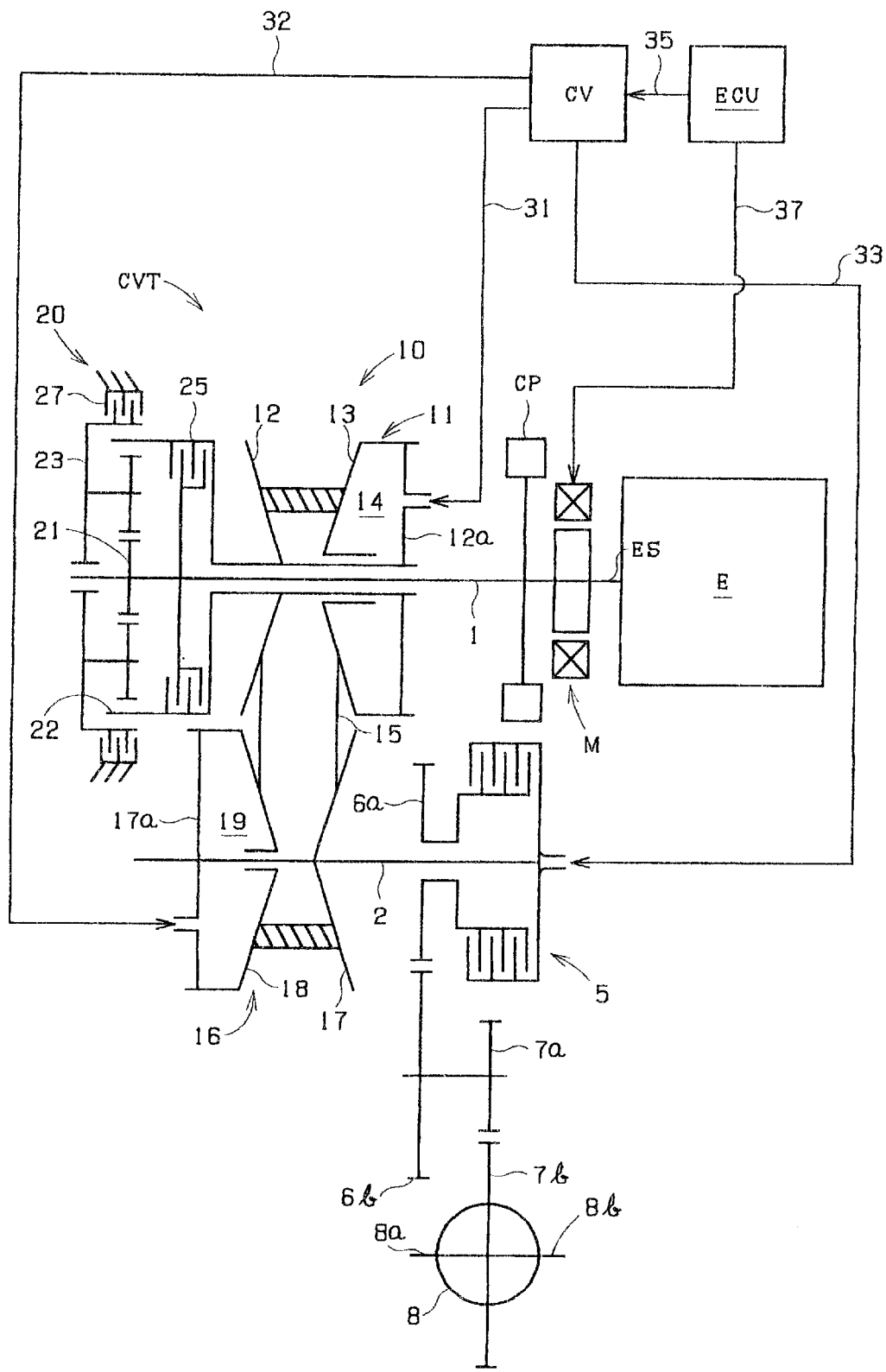
FIG. 2 is a schematic diagram showing the construction of the power transmission mechanism of this transmission.

FIG. 1 is a cross-sectional view of a vehicular transmission which incorporates a control system according to the present invention. FIG. 2 shows the construction of the power transmission mechanism of this vehicular transmission, which comprises an engine E, an electrical motor M, and a continuously variable transmission CVT. The electrical motor M is disposed over the output shaft Es of the engine while the continuously variable transmission CVT is connected through a coupling mechanism CP to the engine output shaft Es. The engine E is a fuel injection engine, so the injection of fuel into the engine is terminated when the vehicle decelerates as described in detail later in this section. The electrical motor M is powered by a battery which is mounted on the vehicle, and the electrical motor assists the driving force of the engine. In this way, the vehicular transmission is constructed as a hybrid transmission with these two power sources.

The continuously variable transmission CVT comprises a metal V-belt mechanism 10, a forward/reverse switching mechanism 20 and a starting clutch (or main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to the differential mechanism 8 and then used for driving axle shafts 8a and 8b to rotate the right and left wheels of the vehicle (not shown). The continuously variable transmission CVT is provided with a hydraulic pump P, which is driven through a chain that is disposed around a sprocket mounted on the input shaft 1 to generate the hydraulic pressure necessary for supplying lubrication oil and for controlling hydraulic actuators.

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the outside of the movable pulley half 13, a drive-pulley cylinder chamber 14 is defined by a cylinder wall 12a which is fixed to the stationary pulley half 12. The pressure supplied through a control valve CV and through an oil passage 31 into the cylinder chamber 14 (this pressure is referred to as "drive pulley pressure") generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the outside of the movable pulley half 18, a driven-pulley cylinder chamber 19 is defined by a cylinder wall 17a which is fixed to the stationary pulley half 17. The pressure supplied through the control valve CV and through an oil passage 32 into the cylinder chamber 19 (this pressure is referred to as "driven pulley pressure") generates a thrust which shifts the movable pulley half 18 in the axial direction of the driven pulley.

In this construction, the control system controls the hydraulic pressures which are supplied into these cylinder chambers 14 and 19, respectively, (the side thrusts of the drive and driven pulleys) by the control valve CV to generate appropriate lateral thrusts in these two pulleys. Specifically, the system, while preventing any slip of the belt 15, adjusts the difference between the pressures supplied to the drive and driven pulleys, so that the side thrusts generated in the respective pulleys change the widths of the V grooves of the drive and driven pulleys 11 and 16. Thereby, the pitch radii of the respective pulleys for the V belt 15 are changed to vary the speed change ratio of the transmission continuously.

Furthermore, the forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when this forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction).

The starting clutch 5 is a clutch to control the power transmission between the countershaft 2 and the output members of the transmission, i.e., gears 6a, 6b, 7a and 7b. When the starting clutch 5 is engaged, the power is transmitted therebetween. In the condition where the starting clutch 5 is engaged, the output of the engine, after undergoing the speed change by the metal V-belt mechanism 10, is transmitted through the gears 6a, 6b, 7a and 7b to the differential mechanism 8 and then divided and transmitted by the differential mechanism 8 to the right and left wheels. When the starting clutch 5 is released, this power transmission is terminated, and the transmission comes into a neutral condition. The engagement of the starting clutch 5 is carried out by a pressure supplied through the control valve CV and through an oil passage 33 (this pressure is referred to as "clutch control pressure").

In the continuously variable transmission CVT, the drive and driven pulley pressures supplied through the control valve CV and through the oil passages 31 and 32, respectively, are used for the speed change control while the clutch control pressure supplied through the control valve CV and through the oil passage 33 is used for the actuation of the starting clutch. The control valve CV itself is controlled by means of control signals sent from an electrical control unit ECU.

In the vehicle incorporating this transmission, the electrical motor M assists the engine E such that the engine E can operate in a range which is most fuel efficient. To improve the fuel efficiency of the vehicle, the operation of the electrical motor M is controlled by means of control signals which are sent from the electrical control unit ECU through a line 37. At the same time, the speed change control is performed to achieve an optimal speed change ratio for operating the engine E in a most fuel efficient manner. This control is also carried out by means of control signals sent from the electrical control unit ECU through a line 35 to the control valve CV.

To further improve the fuel efficiency, the control system according to the present invention additionally performs an idling elimination control. Basically, this idling elimination control is to stop the operation of the engine when the vehicle stops, and when the driving force of the engine becomes unnecessary, i.e., the engine enters into an idling condition. However, to achieve a higher level of fuel efficiency, this system goes further than this basic control. Specifically, the system controls the transmission to terminate the fuel injection if the accelerator pedal is released to decelerate and to stop the vehicle, for preventing the engine from idling.

To avoid the above mentioned riding quality impairment, the release of the starting clutch 5 is controlled appropriately after the termination of the fuel injection and before the halt of the engine. Now, this control, which is executed on condition that the fuel injection is terminated to decelerate the vehicle, is described in reference to the flowcharts shown in FIGS. 3~6.

Figure 3:
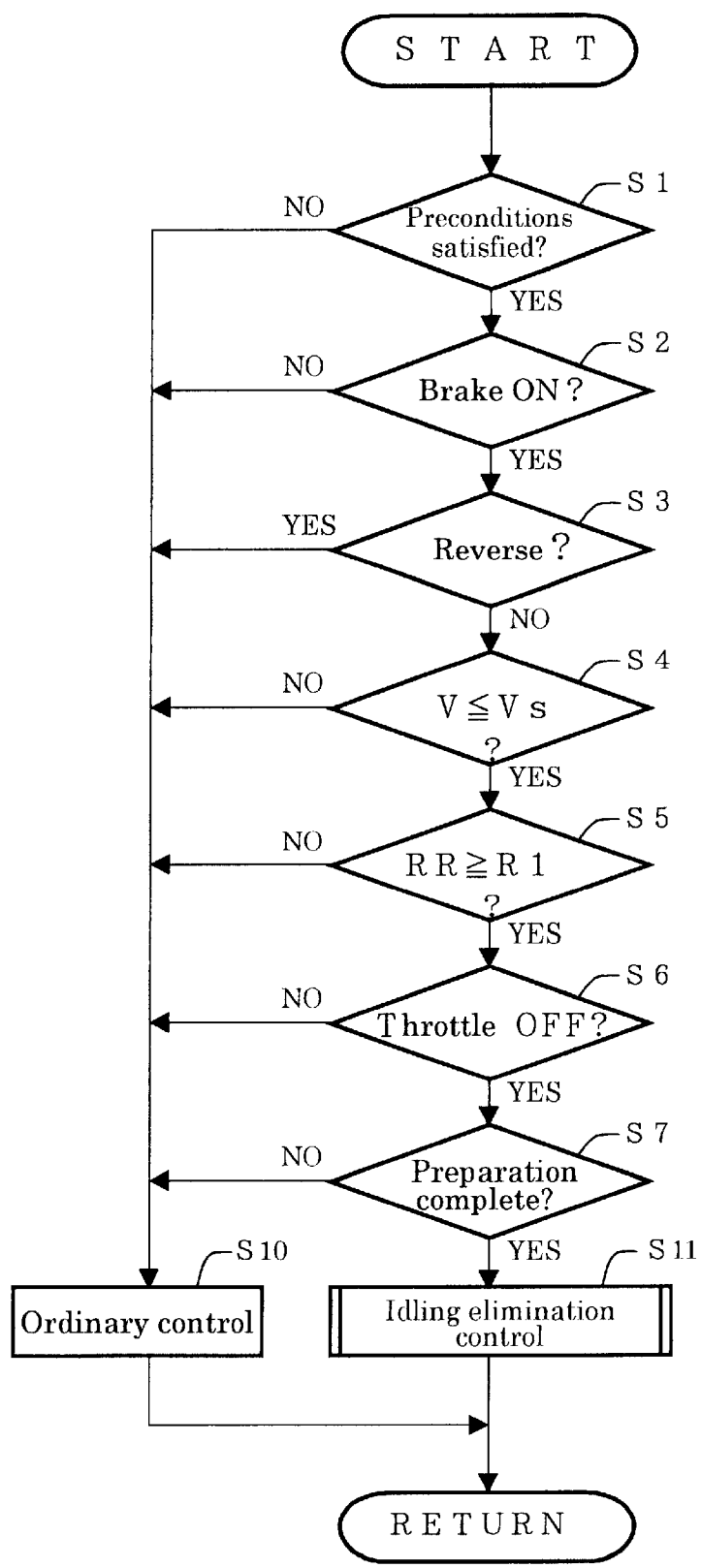
FIG. 3 is a flowchart showing some steps of an idling elimination control according to the present invention, which control is effective when the transmission is operated to decelerate.

This control begins at Step S1 shown in FIG. 3, where a judgment is made whether a precondition for the idling elimination control is satisfied or not. As preconditions, for example, the temperature of the oil in the transmission must be above a predetermined value so as not to cause any retardation in responsive actions, and the slope regression inhibitor of the transmission is in good condition. If such preconditions are not satisfied, then the control routine proceeds to Step S10 to control the engine in an ordinary way. In other words, if the preconditions for the termination of the fuel injection are not satisfied, then the control resumes the fuel injection control. The above mentioned slope regression inhibitor functions to retain an enough hydraulic pressure for the brake to keep the vehicle stationary on a slope even while the driver is not depressing the brake pedal.

If the judgment at Step S1 is that the preconditions are satisfied, then the control routine proceeds to Step S2, where a determination is made whether the brake of the vehicle is on or off, i.e., the brake pedal is depressed or not. If the brake is off, then the control routine proceeds to Step S10 to perform the ordinary drive control. On the other hand, if the brake is on, then the control proceeds to Step S3, where a determination is made whether the transmission is in the reverse drive range or not. The idling elimination control is executed only while the transmission is in the forward drive range. Therefore, if the determination indicates that the transmission is in the reverse drive range, then the control routine proceeds to Step S10 to perform the ordinary drive control. On the other hand, if the transmission is not in the reverse drive range, then the control routine proceeds to Step S4, where a determination is made whether the speed V of the vehicle is equal to or lower than a predetermined speed Vs (e.g., 15 km/h) or not. The idling elimination control is a control which is executed when the vehicle is being stopped. Therefore, if the vehicle is not driving at a low speed, the control routine proceeds to Step S10 to perform the ordinary drive control.

When the speed of the vehicle decreases below the predetermined speed, the control routine proceeds to Step S5, where a determination is made whether the reduction ratio RR of the transmission is equal to or greater than a predetermined reduction ratio R1 (LOW ratio) or not. The idling elimination control is executed to stop the engine, so if the engine is stopped, then the speed change ratio cannot be changed thereafter. Therefore, it is necessary that the speed change ratio be adjusted to a LOW ratio before the start of the idling elimination control, so that the vehicle can be started smoothly after the restart of the engine. Thus, the predetermined reduction ratio R1 is a ratio (=2.2) near the LOW ratio (=2.4), and the determination at Step S5 is to determine whether the reduction ratio of the transmission has become a ratio near the LOW ratio or not. Until such a ratio is achieved, the control routine proceeds to Step S10 to perform the ordinary drive control. When such a ratio is achieved, the control routine proceeds to Step S6, where a determination is made whether the throttle of the engine is closed or not. If the throttle is open, i.e., the accelerator pedal is depressed by the driver, then the control routine proceeds to Step S10 to perform the ordinary drive control, and the idling elimination control is not executed because the driver is judged having no intention to stop the vehicle.

As described above, only if the preconditions are satisfied, the brake is on, the transmission is not in the reverse drive range, the vehicle is driving at a speed lower than the predetermined speed, the reduction ratio is almost at the LOW ratio, and the throttle is closed, then the idling elimination control is executed. However, before the idling elimination control, further determinations are made at Step S7 whether preparations for the idling elimination control are complete or not. Here, for example, if the air conditioner of the vehicle is on or not, if there is enough charge in the battery or not, and if the negative pressure used to assist the operation of the brake is at an appropriate level or not are determined. If the air conditioner is on, if the battery do not have enough charge, or if the negative pressure for assisting the brake is short, then the control routine proceeds to Step S10 to perform the ordinary drive control. On the other hand, if these preparations are judged complete, then the control routine proceeds to Step S11, where the control transits to the idling elimination control.

Figure 4:
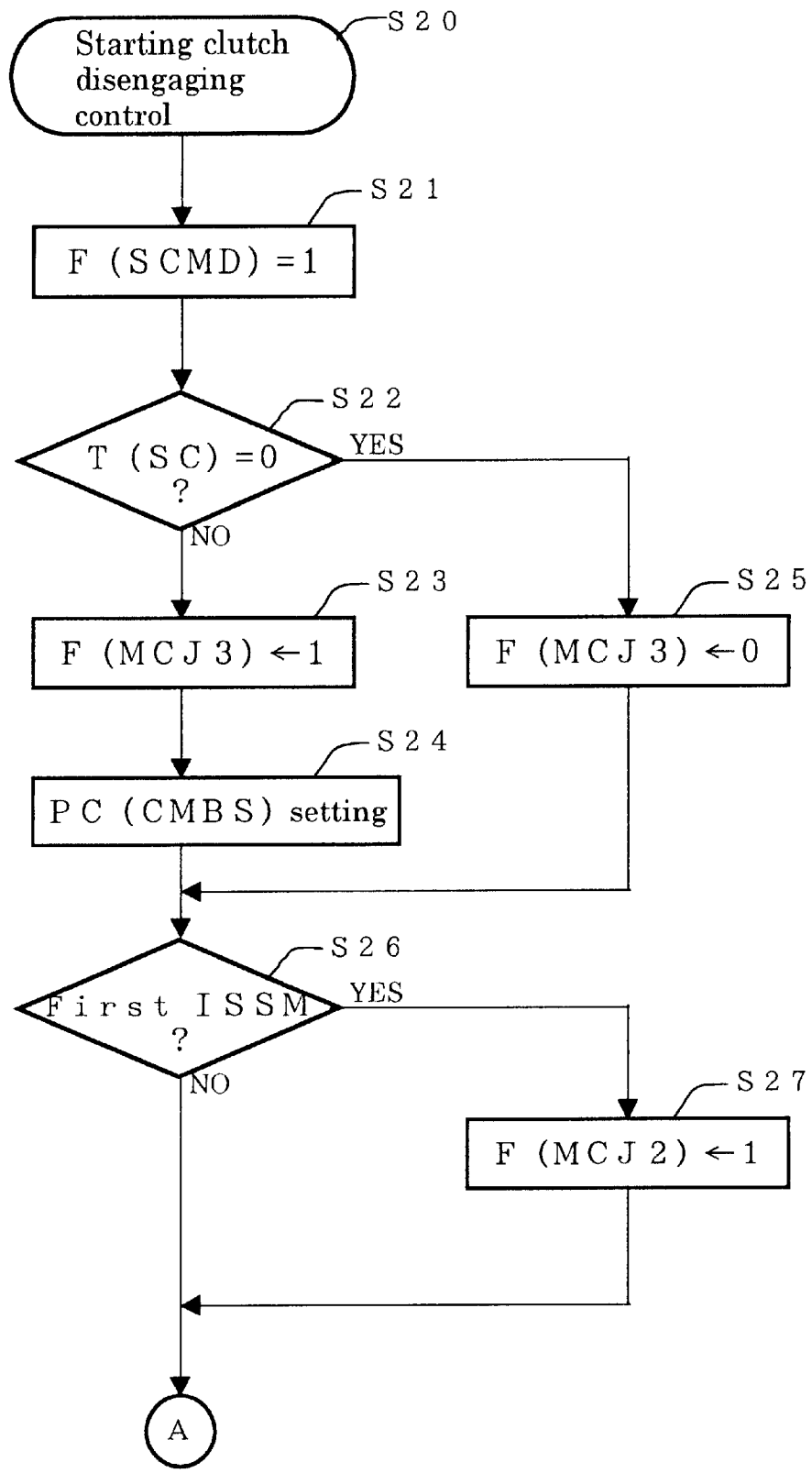
FIG. 4 is another flowchart showing further steps of the idling elimination control.
Figure 5:
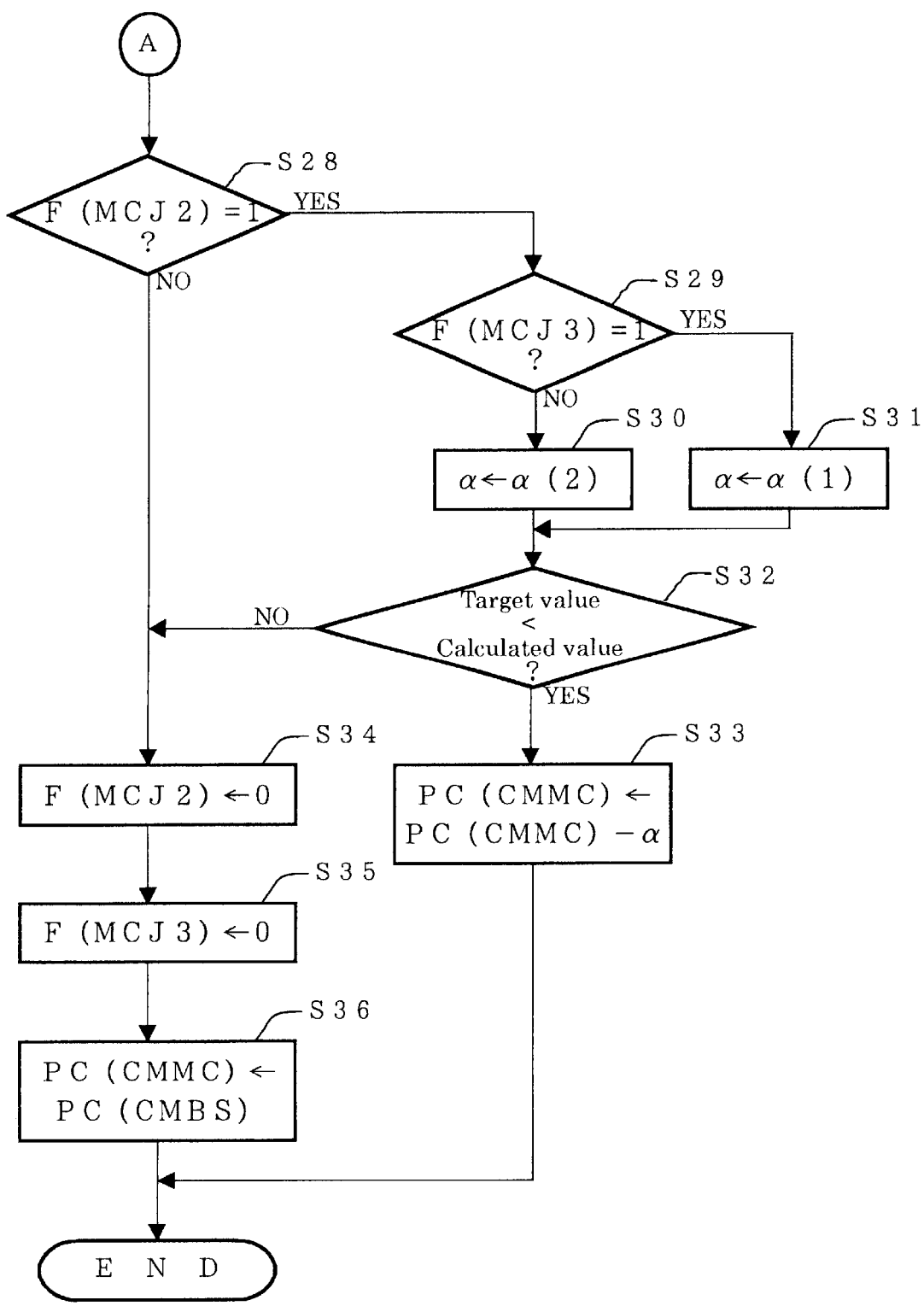
FIG. 5 is another flowchart showing still further steps of the idling elimination control.
Figure 6:
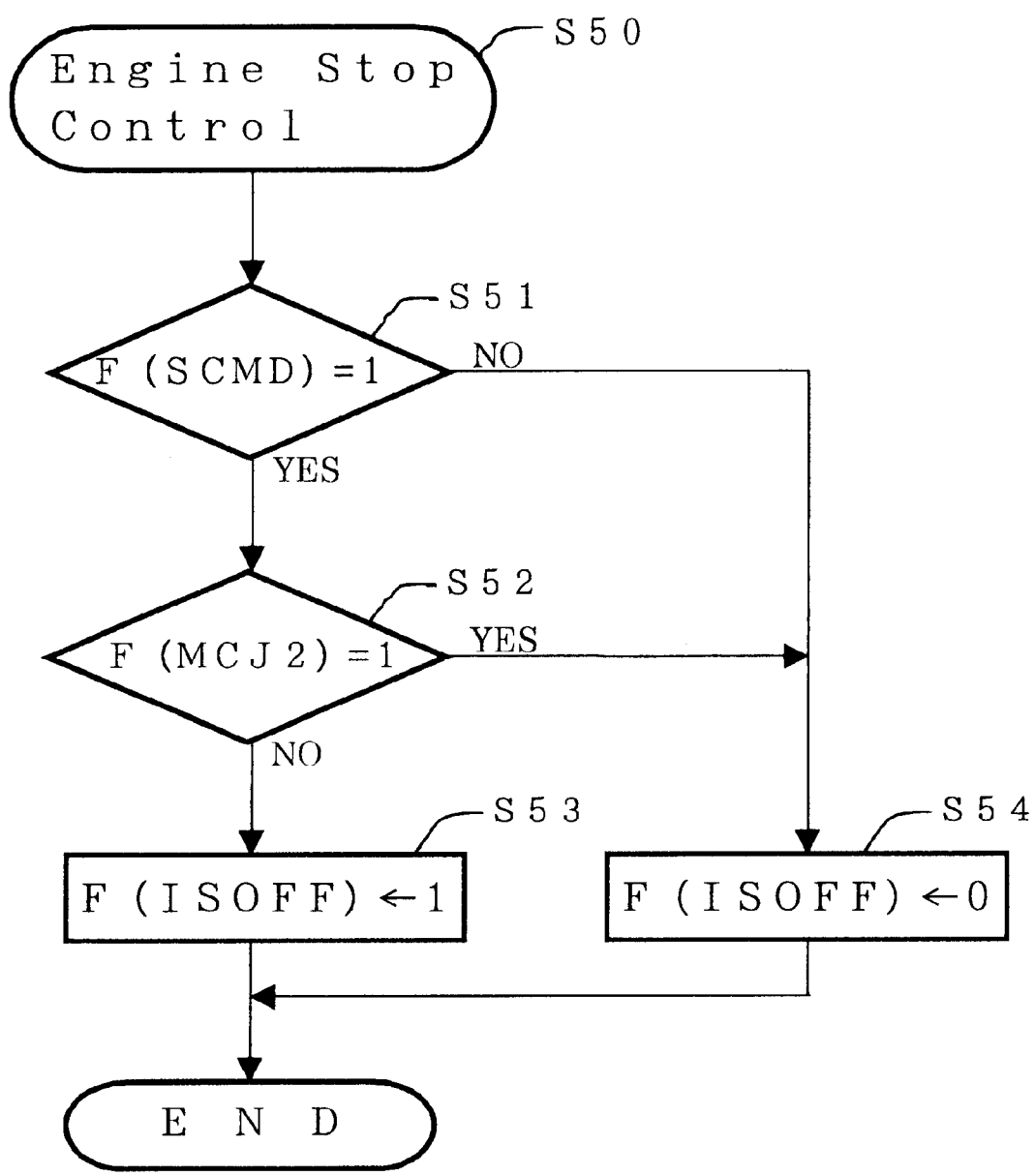
FIG. 6 is another flowchart showing yet further steps of the idling elimination control.

The idling elimination control comprises a starting clutch disengaging control S20 shown in FIGS. 4 and 5 (the circled "A" of the flowchart in FIG. 4 connects with that of FIG. 5, making up a continuous flowchart) and an engine stop control S50 shown in FIG. 6.

At first, a description is given of the starting clutch disengaging control S20. In this control, firstly, a starting clutch off mode selection flag is set up, F(SCMD)=1, at Step S21 to indicate that the control flow has arrived at Step S11. This flag is used as a judgment flag in the engine stop control shown in FIG. 6. Next, at Step S22, a determination is made whether the torque capacity of the starting clutch 5 has become zero, T(SC)=0, or not. If it is not zero, T(SC)≠0, then the control routine proceeds to Step S23, where a clutch gradual release flag is set up F(MCJ3)=1. Then, at Step S24, a target clutch pressure PC(CMBS) is set for the starting clutch 5. This target clutch pressure PC(CMBS) is a pressure to control the clutch so that the torque capacity of the starting clutch becomes zero, T(SC)=0. On the other hand, if the torque capacity is zero, T(SC)=0, then the control routine proceeds to Step S25, where the clutch gradual release flag is set down, F (MCJ3)=0.

Then, the control routine proceeds to Step S26, where a determination is made whether or not this is the first flow through the starting clutch disengaging control. If it is the first flow, then a disengagement control flag is set up, F(MCJ2)=1, at Step S27. It is clear from this that the disengagement control flag is set up, F(MCJ2)=1, when the starting clutch disengaging control has just started.

Then, the control routine proceeds to Step S28, where a determination is made whether the disengagement control flag is up, F(MCJ2)=1, or not. If the disengagement control flag is up, F(MCJ2)=1, then the control routine proceeds to Step S29, where a determination is made whether the clutch gradual release flag is up, F(MCJ3)=1, or not. If the clutch gradual release flag is up, F(MCJ3)=1, then a small value α(1) is set as a pressure reduction value α to reduce the clutch control pressure gradually because the starting clutch 5 needs to be released gradually. On the other hand, if the clutch gradual release flag is down, F(MCJ3)=0, then a large value α(2)(>α(1)) is set as the pressure reduction value α to reduce the clutch control pressure rapidly because the starting clutch 5 can be released quickly as the torque capacity of the clutch is zero.

At Step S32, this pressure reduction value α is subtracted from the starting clutch control pressure PC(CMMC) at the moment, and the value resulted from this subtraction is compared with the target value, i.e., the target clutch pressure PC(CMBS) set at Step S24. If the target value is smaller than the value calculated in the above subtraction, i.e., the starting clutch control pressure has not decreased to the target value, then the control routine proceeds to Step S33, where the value resulted from the subtraction of the pressure reduction value α from the current starting clutch control pressure PC(CMMC) is set as a new starting clutch control pressure to control the starting clutch.

On the other hand, if the target value is equal to or greater than the value calculated in the above subtraction, i.e., the starting clutch control pressure has decreased to the target value, then the control routine proceeds to Steps S34, S35 and S36. There, the disengagement control flag is set down, F (MCJ2)=0, at Step S34, the clutch gradual release flag is set down, F(MCJ3)=0, at Step S35, and the target clutch pressure PC(CMBS) is set as the starting clutch control pressure PC(CMMC) at Step S36. It is clear from the above description that, in the starting clutch disengaging control S20, the clutch control pressure is decreased gradually to the target clutch pressure PC (CMBS), i.e., the starting clutch 5 is released gradually.

Now, a description is given of the engine stop control S50 shown in FIG. 6. In this control, at first, a determination is made whether the starting clutch off mode selection flag is up, F(SCMD)=1, or not at Step S51. If it is down, F(SCMD)=0, which condition indicates that the above mentioned starting clutch disengaging control S20 is not being performed, then the control routine proceeds to Step S54, where an idling elimination control flag is set down, F(ISOFF)=0. In this case, the idling elimination control is not performed. On the other hand, if the starting clutch off mode selection flag is up, F(SCMD)=1, which condition indicates that the above mentioned starting clutch disengaging control S20 has been started, then the control system judges that the conditions required for stopping the engine are satisfied and allows the engine to be stopped by maintaining the stoppage of the fuel injection. Therefore, the control routine proceeds to Step S52, where a determination is made whether or not the disengagement control flag is down, F(MCJ2)=0, i.e., whether the control for releasing the starting clutch 5 gradually so as to make the torque capacity of the starting clutch 5 zero has completed or not.

If the disengagement control flag is up, F(MCJ2)=1, which condition indicates that the control for releasing the starting clutch 5 is being executed, then the control routine proceeds to Step S54, where the idling elimination control flag is set down, F(ISOFF)=0, and the idling elimination control is not yet started. If the disengagement control flag is down, F (MCJ2)=0, which condition indicates that the control for releasing the starting clutch 5 has completed, then the control routine proceeds to Step S53, where the idling elimination control flag is set up, F(ISOFF)=1, and the idling elimination control is executed. Specifically, this idling elimination control stops the engine forcibly by using the electrical motor.

As described above, when the brake is operated to stop the vehicle without fuel injection, the idling elimination control is executed after the control to release the starting clutch 5 gradually is complete. When the vehicle is brought into a halt, the engine has also ceased its operation. In this condition, the speed change ratio of the transmission of the vehicle is set at the LOW ratio.

The control system according to the present invention controls to set the electrical current flowing through the control valve CV to zero after the operation of the engine is terminated by the idling elimination control. The actuation of the control valve CV comprising linear solenoid valves is controlled by means of control signals (control currents) sent from the electrical control unit ECU. To improve the responsibility of the system for the control signals, the control valve CV is supplied constantly with a base current (normally, about a few hundred mA). This current is not necessary after the operation of the engine is terminated, so the control system turns off the base current. In other words, the system makes or adjusts the control current flowing through the control valve CV almost to zero and thereby avoids wasteful power consumption.

The steps of this control, which are shown in a flowchart in FIG. 7, adjust a drive pulley thrust control current and a driven pulley thrust control current, which are sent from the electrical control unit ECU through the line 35 to the control valve CV (these currents are used for actuating the linear solenoid valves which sets the thrusts necessary for adjusting the variable widths of the respective pulleys and are hereinafter referred to as "pulley thrust control currents"). This pulley thrust current control S70 is intended to be executed along with the above mentioned idling elimination control.

Figure 7:
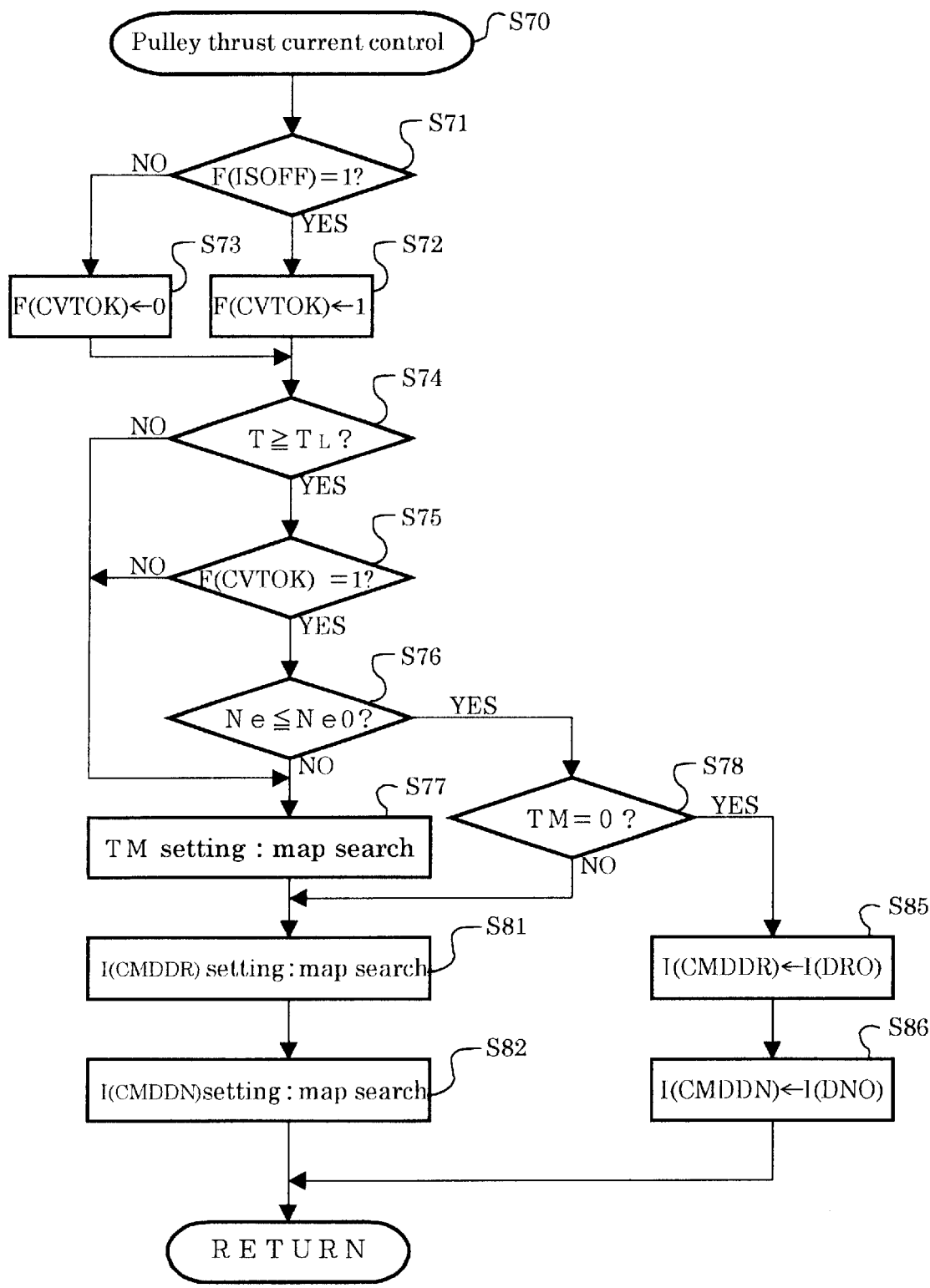
FIG. 7 is a flowchart showing steps for adjusting electrical currents which control the speed change mechanism of the transmission.

Referring to FIG. 7, a determination is made at Step S71 to find out whether the idling elimination control flag is set up, F(ISOFF)=1, or not. This flag F(ISOFF) indicates whether the starting clutch 5 has been released or not in the idling elimination control (refer to Step S53 in FIG. 6). If the flag is up, F(ISOFF)=1, then the control routine proceeds to Step S72, where a flag used for judging a transition to an inhibitory control of the pulley thrust control current is set up, F(CVTOK)=1. If the idling elimination control flag is down, F(ISOFF)=0, then the control routine proceeds to Step S73, where the above transition judgment flag is set down, F(CVTOK)=0.

Then, the control proceeds to Step S74, where a determination is made whether the temperature T of the oil used for the actuation of the transmission is equal to or higher than a predetermined temperature TL (for example, 30 degrees Celsius) or not. If the temperature T is lower than the predetermined temperature TL, then the control routine proceeds to Step S77 to perform a normal pulley thrust current control. In this case, the above mentioned inhibitory control of the pulley thrust control current is not executed because the condition is not favorable. When the oil temperature is low, the viscosity of the oil is high, so the hydraulic pressure in the control valve CV and the oil passages remains relatively high even after the operation of the engine has ceased.

On the other hand, if the oil temperature T is judged equal to or higher than the predetermined temperature TL at Step S74, then the control routine proceeds to Step S75, where a determination is made whether the above mentioned transition judgment flag is up, F(CVTOK)=1, or not. If the flag is judged being down, F(ISOFF)=0, then the control routine proceeds to Step S77 to perform a normal pulley thrust current control. In this case, the inhibitory control of the pulley thrust control current is not executed because the condition is not favorable as the flag being set down indicates that the starting clutch 5 has not been released in the idling elimination control. On the other hand, if the flag is judged being up, F(ISOFF)=1, indicating that the starting clutch 5 has been released in the idling elimination control, then the control routine proceeds to Step S76.

At Step S76, a determination is made whether the rotation of the engine has stopped or not, i.e., the engine rotational speed Ne has become almost zero or not (Ne<Ne0, for example, below 64 rpm). The setting up of the transition judgment flag F(CVTOK)=1 indicates that the idling elimination control has been completed. However, in this condition, the engine may be still rotating though the starting clutch 5 has been released. If the rotation of the engine is not stopped, then also the rotation of the hydraulic pump P, which is connected rotationally to the input shaft 1 and driven through a chain by the engine, is not stopped. If the pulley thrust control current is terminated in this condition, then there is a possibility that a maximum pressure may be supplied into the oil chambers of the respective pulleys. To eliminate this possibility, only if the rotation of the engine is judged to have stopped at Step S76, the control routine proceeds to Step S78, where it enters into a loop for the inhibitory control of the pulley thrust control current. If the engine is judged still rotating, then the control routine proceeds to Step S77 to perform the ordinary pulley thrust current control.

Steps S77, S81 and S82 represent a loop in which the inhibitory control of the pulley thrust control current is not performed. At Step S77, a time TMI which is set for a timer TM to execute the inhibitory control of the pulley thrust control current is retrieved from memory of the electrical control unit ECU. The time TMI set for the timer is to delay the execution of the inhibitory control of the pulley thrust control current, and the time is used for timing a point where the pressure supplied to the control valve CV becomes zero after the rotation of the engine has ceased. Therefore, the time TMI is determined in consideration of the temperature T of the oil used for the actuation of the transmission, and values for the time TMI are arranged in a map format. The higher the temperature T is, the shorter the time TMI is set. In other words, the lower the temperature T is, the longer the time TMI is set. After the time TMI is set, the count down of the time is initiated, and the control routine proceeds to Step S81.

At Step S81 and Step S82, a drive pulley thrust control current command value I(CMDDR) and a driven pulley thrust control current command value I(CMDDN), respectively, are retrieved from memory of the electrical control unit ECU for the ordinary control of the transmission. The thrusts necessary for the variable width drive and driven pulleys 11 and 16 (or the pressures which generate the thrusts) are predetermined in consideration of the output torque of the engine, and values for the respective control currents are arranged in a map format in correspondence to the thrusts required and are stored in memory. At Step S81 and Step S82, the control current values which correspond to the thrusts required are retrieved from memory and set, respectively. Then, the control routine returns to Step S1.

In this way, the time TMI of the timer is renewed each time in the ordinary control of the pulley thrust control current, and the pulley thrust currents I(CMDDR) and I(CMDDN) are reset each time in correspondence to the driving condition of the vehicle.

On the other hand, if the rotation of the engine is judged to have ceased at Step S76, then the control routine proceeds to Step S78, where it enters into the control loop which restricts the pulley thrust control current. At Step S78, a determination is made whether the time TMI of the timer, which was set and triggered for a count-down at Step S77, has reached zero or not. If the time TMI has not decreased to zero, then the control routine proceeds to Step S81 and to Step S82, where the pulley thrust control current is controlled in the ordinary way. Then, the control routine returns to Step S1. In this loop, the control does not go through Step S77, at which the time TMI is renewed. Therefore, the time TMI is not renewed but reduced along with the elapse of time.

After the rotation of the engine had ceased, when the time set at Step S77 is cleared, the time TMI of the timer becomes zero. Because the time TMI set at Step S77 is a time value which is predetermined on the basis of the time that is required for the hydraulic pressure supplied to the control valve CV to return to zero after the cessation of the rotation of the engine, when the time TMI has elapsed, TMI=0, the pressure supplied to the control valve CV has become zero. Therefore, if the time is judged to have reached zero, TMI=0, at Step S78, then the control routine proceeds to Step S85 and Step S86.

At Step S85 and Step S86, the drive pulley thrust control current command value I(CMDDR) and the driven pulley thrust control current command value I(CMDDN) are set to inhibitory current command values I(DR0) and I(DN0), respectively, so the respective control currents are adjusted substantially to zero. Basically, these inhibitory current values I(DR0) and I(DN0) can be zero. However, in this embodiment, a weak current (for example, about 1.5 mA) is supplied to maintain a function which detects any breakage of the electrical wiring of the circuit that controls the transmission even after the termination of the operation of the engine. In this way, the inhibitory control of the pulley thrust control currents is executed to shun the wasteful power consumption for saving energy.

As described above, while the vehicle is being decelerated after the termination of the fuel injection, if the brake is operated to bring the vehicle into a halt, at first the starting clutch 5 is released gradually, and then the idling elimination control is performed. After the idling elimination control, the electrical power supplied to the transmission is terminated to save electricity. Therefore, according to the present invention, the efficiency of the transmission is improved further by the efficient use of electricity which avoids wasteful consumption in addition to the fuel efficiency improved by the termination of the fuel injection.

The above embodiment describes the control which makes the pulley thrust control currents supplied to the metal V-belt type continuously variable transmission substantially to zero. However, a similar control can be applied to the electrical current that is supplied to other parts of the speed change mechanism of the transmission (for example, the starting clutch 5). In the above embodiment, the point where the pressure supplied to the control valve CV becomes almost zero is determined from the elapsed time which is measured after the cessation of the engine rotation. However, this point may be determined, for example, by providing a pressure sensor and by actually measuring the pressure. Also, the termination of the currents itself may be timed after the point where the pressure becomes substantially zero.

The above transmission comprises an engine whose drive force is assisted by the operation of an electrical motor. However, the present invention is not limited to this type of transmission and can be implemented also with a transmission which does not incorporate an electrical motor. Not only the above metal V-belt type continuously variable transmission but also other types of transmission, even a transmission with a multiple speed ratio speed change mechanism, can be utilized for the implementation of the present invention as long as they are controlled electrically.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 11-199865 filed on Jul. 14, 1999, which is incorporated herein by reference.

What is claimed is:

1. A stop control system for a power transmission used for driving a vehicle, said transmission comprising an engine and a speed change mechanism which transmits a driving force from said engine with a speed change, said engine being stopped when said vehicle is brought into a halt, wherein: after said engine is stopped, a control for decreasing an electrical current that controls said speed change mechanism is executed by an ECU, and wherein said speed change mechanism comprises a control valve.

2. The control system as set forth in claim 1, wherein said power transmission further comprises an electrical motor, which is connected to an output shaft of said engine, and said electrical motor assists said driving force of said engine.

3. The control system as set forth in claim 1, wherein when an accelerator pedal, which has been stepped down, is released to decelerate said vehicle, a control for terminating fuel supply to said engine is executed, and when said vehicle is brought into a halt, this condition of non-fuel supply is maintained to stop the operation of said engine.

4. The control system as set forth in claim 1, wherein, after said engine has stopped, and after a hydraulic pressure for actuating said speed change mechanism has decreased, said control for adjusting said electrical current supplied to said speed change mechanism almost to zero is executed.

5. The control system as set forth in claim 4, wherein said speed change mechanism comprises a V-belt type continuously variable speed change mechanism, and after a hydraulic pressure that generates a thrust that acts laterally in drive and driven pulleys for varying a speed change ratio of said belt type continuously variable speed change mechanism has decreased, said control for adjusting said electrical current supplied to said speed change mechanism almost to zero is executed.

6. The control system as set forth in claim 1, wherein:

after said engine has stopped, if temperature of oil used for generating a hydraulic pressure that actuates said speed change mechanism is lower than a predetermined temperature, said control for adjusting said electrical current almost to zero is restricted.

7. The control system as set forth in claim 1, wherein:

after said engine has stopped, when said control for adjusting said electrical current supplied to said speed change mechanism almost to zero is executed, a weak current is left flowing to detect a failure while other currents used for control are adjusted almost to zero.

8. The control system as set forth in claim 1, wherein said electrical current is decreased to almost zero.

* * * * *